Dec. 24, 1940.  C. SAURER  2,226,505
INSULATOR
Filed April 4, 1938
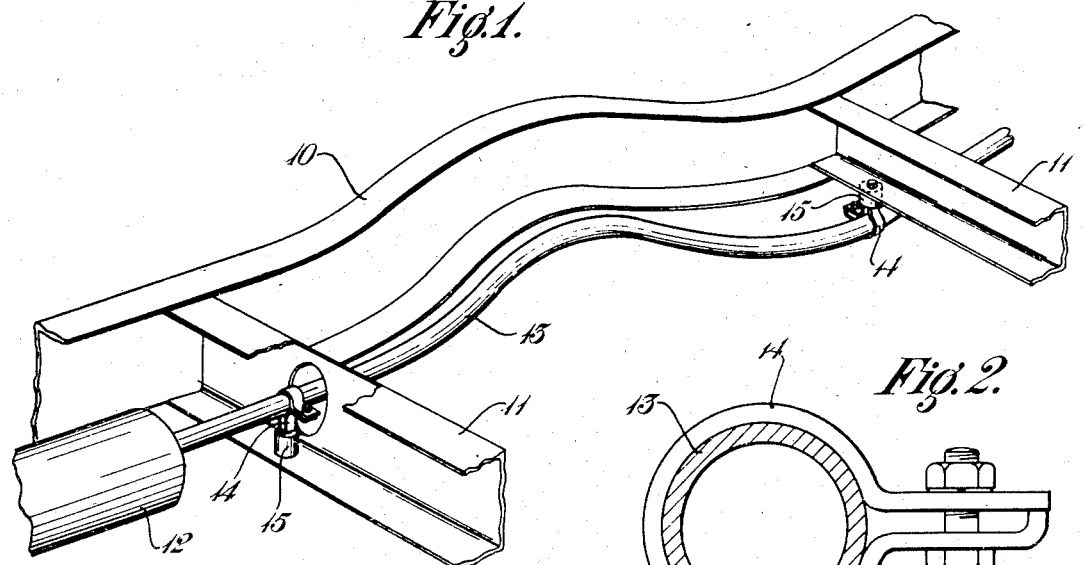
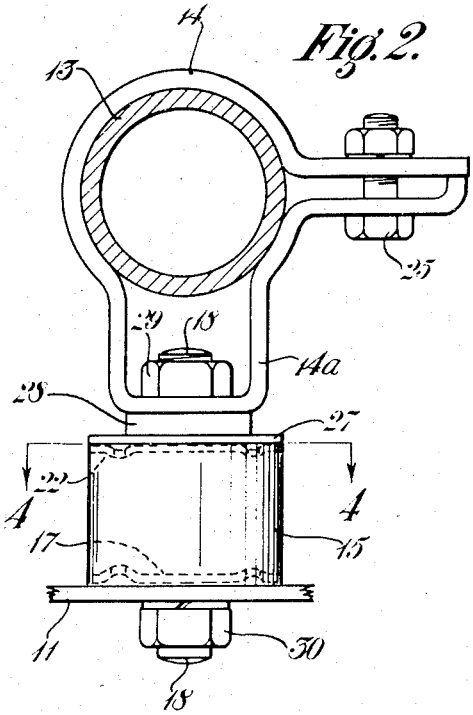
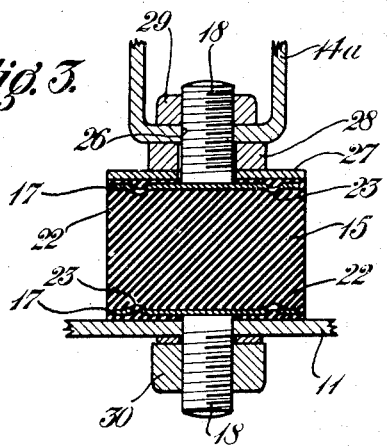
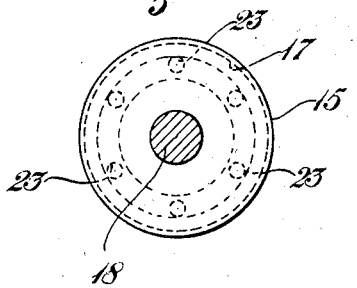
INVENTOR
Curt Saurer
BY
Ely & Frye
ATTORNEYS Patented Dec. 24, 1940

2,226,505

UNITED STATES PATENT OFFICE 2,226,505

INSULATOR

Curt Saurer, Akron, Ohio, assignor to The Firestone Tire & Rubber Company, Akron, Ohio, a corporation of Ohio Application April 4, 1938, Serial No. 199,867

1 Claim. (Cl. 287—85)

This invention relates to insulators, and more especially it relates to vibration insulators such as are utilized for supporting one body from or upon another body in such a manner that vibration of either body is not translated to the other.

Insulators of the character mentioned are extensively used in motor vehicles for damping and suppressing vibration to the end that quietness of travel is achieved. The insulator constituting the subject matter of the present invention is especially adapted to situations wherein the supported load is of light weight, and is shown herein as supporting a vehicle muffler and exhaust pipe from the frame of the vehicle, although it is not limited to this particular use. The insulator is shown both in a position where it is under tension, and in a position where it is under compression. It is the unit that is under compression that will be illustrated and described in detail.

The chief objects of the invention are to provide an improved insulator of the character mentioned that is of simple construction; that readily and cheaply may be manufactured; that comprises an improved bond between rubber and metal elements that strongly resist separation thereof; and to provide an insulator especially suitable for supporting a vehicle muffler from the frame of the vehicle. More specifically, the invention aims to provide an insulator of the character mentioned comprising metal and rubber elements, which elements are united by a chemical and mechanical bond. Other objects will be manifest as the specification proceeds.

Of the accompanying drawing:

Figure 1 is a perspective view of a portion of a vehicle frame, a muffler and an exhaust pipe extending from one end of the latter, and two of the improved insulators supporting the muffler and exhaust pipe from the frame;

Figure 2 is a side elevation of the improved insulator, in operative association with a supporting member and a supported member, the latter being shown in section;

Figure 3 is a vertical diametric section of the structure shown in Figure 2; and Figure 4 is a section on the line 4—4 of Figure 2.

Referring to the drawing, 10 is a portion of a side rail of the frame of a motor vehicle, 11, 11 a portion of transverse bracing members of said frame, 12 is a muffler of usual construction, 13 is an exhaust pipe extending from one end of the muffler and constituting the outlet thereof, 14, 14 are metal straps about the pipe 13, and 15, 15 are insulators interposed between the respective straps 14 and the cross-braces 11 to support the muffler 12 and pipe 13. Another insulator (not shown) may be interposed between the frame 10 and the pipe that constitutes the inlet to the muffler 12. As shown in Figure 1, one of the insulators 15 is under tension and the other is under compressive stress. Although the insulators function substantially as well in either position, the compression position is preferable, and it is in this position that the insulator is shown in detail in Figures 2 and 3.

The insulator 15 consists primarily of a body of resilient vulcanized rubber, preferably cylindrical in form. Embedded in the rubber structure, adjacent each end thereof, is a metal washer 17, and secured to one face of said washer, as by welding, is an axially disposed stud bolt 18, said bolt projecting beyond the adjacent end face of the rubber structure. The rubber block 15 may be chemically bonded to the washers 17 and stud bolts 18 in any of the known methods. Each washer 17 is formed with an annular corrugation 22 which may be concentric with the axis of the washer, and the washer is so mounted in the rubber structure that the concave side of the corrugation faces the adjacent end of the insulator. The washer also is formed with a concentric series of apertures 23, which apertures are located in the corrugation 22. The washers 17 are of slightly smaller diameter than the rubber structure so as to be completely embedded therein, and are disposed so near the end faces of the structure as to be covered only by a relatively thin layer of rubber, about ½₂ inch thickness of rubber being sufficient. The rubber extends through the several apertures 23 of the washers and unites the thin layers of rubber on the outer faces thereof with the main rubber body.

Each metal strap 14 that embraces the pipe 13 has an offset portion 14a, to which portion the insulator 15 is connected, said offset portion being of such radial extent that the insulator will be spaced at least one inch from the pipe 13 so as not to be affected by the heat thereof. The respective ends of the strap 14 are in spaced relation, substantially radially of the pipe 13 as shown, and engaged by a bolt 25 by means of which the strap is clamped upon the pipe. The offset portion 14a of the strap is formed with an aperture 26 to receive one of the stud bolts 18 of the insulator. In connecting the insulator to the strap 14, a washer 27 is positioned upon the end face of the insulator, and a spacer collar 28 is positioned between the washer 27 and the outer face of the offset portion 14a of the strap. The insulator and strap are secured in assembled relation by a nut 29 mounted on stud bolt 18, within the offset portion of the strap 14. The other end of the insulator is secured to the cross-brace 11 by means of a nut 30 on the other stud bolt 18. The arrangement is such that the extended axis of the insulator 15 intersects the axis of the pipe 13 so that weight of the latter exerts compressive stress upon the insulator, and most vibration of the pipe is transmitted to the insulator parallel to the axis thereof.

When the insulator is mounted between supported and supporting members as shown, and the nuts 29, 30 are set up tightly, the annular body of rubber in each groove, defined by the corrugation 22 of each washer 17, is put under high compressive stress, with the result that frictional engagement of the rubber with the sides of said washer-grooves is increased and an improved mechanical bond between the metal and rubber is effected. The compressive stress on the rubber within the washer-grooves is communicated to local regions of the insulator body through the apertures 23 of the washers, the high-compression rubber constituting, in effect, rivets that hold the washers securely to the main body of rubber.

Thus the washers are not readily torn from the insulator, as is the case with prior art structures wherein the bonding rubber is not under compressive stress. The invention also makes for quietness within the body of the vehicle and achieves the other objects set out in the foregoing statement of objects.

Modification may be resorted to without departing from the spirit of the invention, or the scope thereof as defined by the appended claim.

What is claimed is:

An insulator comprising a cylindrical body of rubber, metal washers embedded in the body and vulcanized thereto closely adjacent the respective ends thereof, each washer being formed with an annular corrugation with the concave side thereof facing the adjacent end of the rubber structure and having a plurality of apertures located therein and through which the rubber extends to connect with the rubber on the outside of the washers, respective stud bolts connected to said washers and projecting axially from the opposite ends of said insulator, whereby when said insulator is attached between two members with the ends of the insulator held against plane surfaces by means of said bolts the rubber outwardly of said embedded washers and in said corrugations will be placed under compression.

CURT SAURER.